(12) United States Patent
Norlander et al.

(10) Patent No.: US 8,833,392 B2
(45) Date of Patent: Sep. 16, 2014

(54) REGULATING VALVE

(75) Inventors: Per Norlander, Vargarda (SE); Daniel Corso, Ljung (SE); Anders Helstad, Ljung (SE)

(73) Assignee: TA Hydronics AB, Ljung (SE)

( * ) Notice: Subject to any disclaimer, the term of this patent is extended or adjusted under 35 U.S.C. 154(b) by 0 days.

(21) Appl. No.: 13/989,202

(22) PCT Filed: Sep. 28, 2011

(86) PCT No.: PCT/SE2011/051152
§ 371 (c)(1),
(2), (4) Date: Jun. 25, 2013

(87) PCT Pub. No.: WO2012/074450
PCT Pub. Date: Jun. 7, 2012

(65) Prior Publication Data
US 2013/0277595 A1    Oct. 24, 2013

(30) Foreign Application Priority Data

Dec. 1, 2010  (SE) ...................................... 1001148

(51) Int. Cl.
*F16K 3/32* (2006.01)
*F16K 1/52* (2006.01)
*F16K 1/38* (2006.01)
*F16K 3/26* (2006.01)

(52) U.S. Cl.
CPC ... *F16K 1/52* (2013.01); *F16K 1/38* (2013.01); *F16K 3/26* (2013.01); *F16K 3/32* (2013.01)
USPC ....... 137/625.33; 251/121; 251/205; 251/333

(58) Field of Classification Search
USPC ............... 251/120–121, 205, 333; 137/625.3, 137/625.33, 625.38
See application file for complete search history.

(56) References Cited

U.S. PATENT DOCUMENTS 2,014,314 A * 9/1935 Defenbaugh ................. 251/122
2,117,182 A * 5/1938 Dartrey ...................... 137/625.3
(Continued)

FOREIGN PATENT DOCUMENTS

DE      102009011506 A1   9/2010
WO      WO-2009132658 A1  11/2009

OTHER PUBLICATIONS

International Search Report PCT/ISA/210 for International Application No. PCT/SE2011/051152 Dated Feb. 23, 2012.

*Primary Examiner* — John Bastianelli
(74) *Attorney, Agent, or Firm* — Harness, Dickey & Pierce, P.L.C.

(57) ABSTRACT

A regulating valve for flow control of a medium in a heating or cooling system includes a valve body including an inlet connection, an outlet connection, and a valve neck in which a valve seat and a flow through opening are provided. In the valve neck, a complete valve trim and a valve hand wheel are provided. The valve body includes a first cone to determine the preset (Kvs-value) of the maximal flow through the complete regulating valve. The first cone has at least one opening for flowing through of the medium, where the design of the opening determines the regulating characteristic of the complete regulating valve, and where the Kvs-value of the valve is changed continuously, with maintained regulating characteristic. The first cone is arranged continuously, axially displaceable relative the valve seat, whereby selected parts of the opening of the first cone are shielded by the valve seat.

16 Claims, 4 Drawing Sheets

(56) References Cited

U.S. PATENT DOCUMENTS

| | | | |
|---|---|---|---|
| 2,541,176 A * | 2/1951 | Rockwell | 137/625.3 |
| 3,198,479 A * | 8/1965 | Greenwood | 251/121 |
| 3,791,413 A * | 2/1974 | Muller et al. | 137/625.3 |
| 4,703,776 A * | 11/1987 | Rumney | 137/625.3 |
| 5,156,188 A * | 10/1992 | Wakita et al. | 137/625.3 |
| 5,163,476 A * | 11/1992 | Wessman | 137/625.3 |
| 6,293,514 B1 * | 9/2001 | Pechoux et al. | 251/122 |
| 6,807,984 B2 * | 10/2004 | Volovets et al. | 137/625.3 |
| 7,735,514 B2 | 6/2010 | Marstorp et al. | |
| 7,832,425 B2 * | 11/2010 | Wears et al. | 137/625.33 |
| 2007/0262279 A1 * | 11/2007 | Marstorp et al. | 251/118 |
| 2009/0199905 A1 | 8/2009 | Trantham | |
| 2010/0043893 A1 * | 2/2010 | Stenberg | 137/511 |
| 2011/0042603 A1 | 2/2011 | Loeffler et al. | |
| 2011/0186147 A1 | 8/2011 | Rasmussen | |

* cited by examiner

REGULATING VALVE

TECHNICAL FIELD

Present invention relates to a device for regulation the flow output of a medium in a heating or cooling system and where the device is a regulating valve with maintained regulation characteristics at different Kvs-values in one and the same valve.

BACKGROUND ART

Background Art and Technical Problem

Generally known in flow regulation is regulation valves with a regulating characteristic denoted EQ (equal percentage) and also EQM (equal percentage modified). The aim with those techniques is to provide a logarithmic characteristic where the flow through the regulating valve is regulated in a way that a flow is obtained and an output power coming from the system at for example 50% when the cone of the regulating valve is raised up to 50% if its total hub. Optimally this will be achieved irrespective of at which maximal flow the valve is set to, i.e. which maximal Kv-value, denoted Kvs-value, is selected. Valves where the Kvs-value can be set differ from traditional regulating valves, just by this feature and they are denoted preset regulating valves.

There are known solutions with regulating valves with EQM-functions and variable Kvs-value, but in most of those solutions limitations in the regulating function of the valve are introduced where the Kvs-value is connected with the range of lift of the valve, its hub. This limitation leads to that the regulation is impaired because, for some Kvs-values, only a small part of the hub remains for the regulation. The most existing preset able regulating valves are impaired just with that disadvantage, that the range of lift is limited when the valve is preset. One step to improvement of the function is taken by the solution that is disclosed in US 20090199905 A1, where one and the same valve has this EQ/EQM-function and where the characteristic is maintained by changing the maximal flow, the Kvs-value.

Those advantageous functions is accordingly found in older solutions, but principally the function to maintain the characteristic is solved by that several valves are connected in series, which means that the regulating function, the throttling that is crucial for the flow limitation, isn't totally dominating for the change of flow. To secure an optimal flow limitation according to the characteristic of the regulation the construction must be based on only one throttling location.

In earlier solutions there are also problems with sealing against flow leakages in and around the cones of the valves or the flow limiting parts. A lot of solutions are also sensitive for tolerances and demands a high grade of accuracy at the manufacturing of and fitting in the included parts, which has led to that different seals are used to minimize those leakages. The leakages will be particularly problematic at low flows, where the desired flow is small. The influence of a leakage flow will in those operational cases be devastating.

DISCLOSURE OF INVENTION

Summary of the Invention

By the present invention a preset able regulating valve is achieved and the problem with manufacturing tolerances and seals is solved by that the construction is made in a new way that minimize the leakage flows and its effect on the characteristic, at the same time as the valve has the advantageous features with adjustable Kvs-value with maintained regulation characteristic and regulation with full hub irrespective of the preset Kvs-value. In addition the invention has the advantage that the throttling is based on only one throttling location.

The complete regulating valve comprises in a preferred embodiment of the invention a valve body, with an inlet connection and an outlet connection, and to the valve body a valve neck is connected and connections for the measuring nipples. In the valve neck a complete valve trim is provided comprising an upper piece and at the top of the valve neck a valve hand wheel is provided. Through the valve hand wheel and the valve trim a so called shaft is provided, which is an axle that is coordinated with one at the regulating valve mounted actuator for motorizing the regulation function by the valve. Around this valve shaft preferable a return spring is found. In addition the lower part of the valve neck comprises a flow through opening where the medium can flow through the valve, from the inlet connection to the outlet connection. In the bottom of the valve neck in connection with the flow through opening a valve seat is provided.

The presetting of the Kvs-value, i.e. the selection of a desired maximal flow by the actual operational case is solved by that a, preferable sleeve shaped, cylindrical first cone is arranged axially displaceable relative the valve seat. The first cone comprises an opening for a flow through of the fluid flow and the shape of this opening determines the regulation characteristic for the valve to work. The first cone is continuously, axially displaceable in the valve neck and when the cone is displaced relative the valve seat, in direction to or from the valve seat, the opening of the cone is shielded or opened relative the valve seat in different extent and this irrespective of which preset that is whished, i.e. irrespective of which Kvs-value that is selected. The length of movement of the first cone for the presetting, i.e. the length that the cone can be moved by the presetting is the preset length of the complete regulating valve. The invention is not restricted only to have the above said EQ/EQM-characteristic, also the shape of the opening of the first cone determines the regulation characteristic and this characteristic can for example be linear or any other desired characteristic. In the new construction the number of seals is minimized at the same time as the location of the seals that still must be provided because of the moving parts, is favorable and admits selection of sealing materials that are durable over the length of life of the valve.

Furthermore a preferred embodiment of the invention comprises a second cone that preferable is sleeve shaped, and cylindrical and surrounds at least partly the outer surface of the first cone, preferable its upper, farther part, relative the valve seat. By that way of arrangement it is possible to let the opening of the first cone be shielded by the second cone, as far as is desired, by the presetting. The cylindrical shape of the first and the second cone is advantageous by eventual sealing of the leakage flow between the surfaces of the cones opposite each other. The second cone gives additionally advantages by the presetting, which is described above, by that the window, which is formed for the flowing through of the medium, and which according to the first form of execution is limited by the valve seat and the opening of the first cone, also can be limited to selected parts by means of the second cone. This means that it is made possible to select presetting, i.e. expose selected parts of the opening of the first cone for flowing through of the medium to the flow through opening of the valve. In addition the second cone is axially displaceable in the valve body and its valve neck, between a first farther end position relative the valve seat and a second end position in connection to the valve seat. By this, advantages are obtained, compared to older solutions, in a way that additionally functions can be added to the valve, such as regulation and closing functions.

A preferred embodiment of the invention is that the first cone is arranged to regulate the flow through the complete valve in a regulation position, i.e. by a certain operational case. The regulating valve is usually controlled by a mounted actuator, which via any kind of sensor detects a changing in the load/power output in the fluid system where the valve is working. This actuator cooperates with the shaft of the valve, which is the axle that in a regulating valve normally connects the regulating cone with the mounted actuator. When a changing in need or flow, is indicated the shaft is moved according to the invention, axially influenced by the actuator, whereby the movement of the shaft is transmitted to the first and the second cone, which in the regulation position are locked relative each other in the position that is given by the presetting. Since the shaft is fixed arranged with a shut off screw, which in turn is joined with a preset screw, preferable via a thread joint, and that the second cone is axially locked to the preset screw, preferable by a nut and additionally, that also the first cone is axially locked to the preset screw, preferable by a thread joint, both the first and the second cones are accordingly moved at the same time axially influenced by the shaft. The flow through the complete regulating valve is determined by the position of the first cone, with its opening, relative the shielding against the valve seat, and this flow corresponds to the load/power output that exists I every individual operational case. Thus, the flow through the complete regulating valve is variable from 0-100% of the wished maximal flow, the selected Ksv-value, i.e., that for the first and the second cone the entire hub is available irrespective of the setting of the preset in the valve. The position of the second cone relative the first cone is not changed during the regulation, but their mutual position is the same, given by the presetting.

According to a further preferred embodiment of the invention the first cone is axially displaceable relative the second cone. In that way conditions are created for both cones to work either coordinated or individual to provide the desired functions as for example presetting or alternatively shutting off, by that both of the two cones can be brought to different positions relative each other. One advantage with this is for example that in the preferred embodiment the presetting is made from the Kvs-value of the valve, i.e. the movement of the first cone axially and in direction towards or away from the valve seat without influencing the position of the second cone. After performed presetting, when the valve works in its normal/regulating position the position of the second cone along/around the first cone is locked in its selected preset position, via a thread joint according to the above description, and the regulation is made without that the second cones shielding of the opening of the first cone is changed.

In a preferred embodiment of the invention a preset of the valve, i.e. the movement of the first cone to an intended position relative the valve seat, occurs in a way that desired Kvs-value is obtained, by a rotary motion of the valve hand wheel. By that the valve hand wheel indirect via parts in between, is engaged with a preset screw, preferable at its outside, the movement of the valve hand wheel is transmitted to this screw. The preset screw in turn is threaded inside, where the thread surrounds the upper part of the first cone, which upper part also is provided with threads. In this way the rotary motion is transmitted via the threaded joint to the first cone, which is moved axially, to desired position somewhere between its outer positions, indicating max Kv and min Kv. The moment of presetting is in older solutions made with some form of special tools, while this in the now present invention is performed by means of a valve hand wheel.

According to one preferred embodiment of the invention the hub of the complete regulating valve is determined by the movement of the second cone between its end positions, the first farther end position relative the valve seat and the second end position in connection to the valve seat. The movement of the second cone between those end positions is at least equal to the height of the flowing through opening in the valve body. Consequently the second cone doesn't limit and shield the opening of the flow through opening in the farther position of the second cone.

According to a preferred embodiment of the invention the first cone works by regulation with fully hub, irrespective of selected maximal flow through the valve. This means that ir-respective of selected Kvs-value, which is selected in the presetting position, the regulations accuracy is maximal and not as in older solutions where the hub where limited different depending on how the Kvs-value was selected, which implied a limiting of the regulating area. In this new construction a good regulating accuracy is obtained for every preset at the same time as the regulation characteristic is maintained. This is made possible by that the height of the opening in the first cone is at least equal to the sum of the height of the flow through opening in the valve body and the preset length.

According to a preferred embodiment of the invention the height of the flow through opening in the valve body is not affected at all of the presetting of the valve. In the pre set position the second cone is always in its first farther position relative the valve seat and in this position the second cone doesn't shields the flow through opening. In addition, according to the above, the height at the opening of the first cone is larger than the height of the flow through opening and the first cone is arranged so that this height in no way, irrespective of the preset position by the first cone, shields any part of the height of the flow through opening. This means that after the presetting is performed, i.e. in the regulation position of the valve, the entire hub is always accessible, which results in the above described advantages.

According to a further preferred embodiment of the invention the second cone is rotary locked relative the valve neck by that a so called signal ring is provided around the periphery of the second cone and this signal ring includes a raising, a ridge, which preferable has a elongated extension in axial direction along the periphery of the signal ring, and which ridge constitute a raising on both the outer and the inner side of the signal ring. The elongated ridge is inwards, towards the second cone, arranged to be engaged with a groove on the periphery of the second cone whereby the signal ring will be arranged rotary locked around the second cone. Additionally the ridge of the signal ring is outwards, relative the second cone, arranged to run in a groove in the valve neck of the valve body, which groove runs in axial direction relative the second cone and the groove is at least as long as the hub of the valve. Thus the second cone cannot rotate in the valve body but is on the contrary displaceable in axial direction at least as far as the hub of the valve. The rotary locking is necessary for the all in all function of the valve, and the advantage is that the sealing between the first and the second cone and the sealing between the second cone and the valve seat is facilitated when only axial movements between the parts are allowed and consequently the demands on the seal is reduced.

According to a preferred embodiment of the invention the first cone is rotary locked to the second cone by that at least one guide pin is fixed mounted in the second cone and continuous to and through the top of the first cone via a recess in the same. Accordingly the first cone is also indirect rotary locked relative the valve neck. This guide pin is extending in axial direction relative the cones and is formed in a way that the first cone is axially displaceable relative the guide pin and at least to the length that corresponds to the preset length. By that the first cone, with its opening for flowing through of fluid, cannot rotate relative the valve body this opening is by position coordinated with the flow through opening of the valve body and accordingly the opening is in the same position relative to and in flow direction of the complete valve. Thus the pressure drop over the valve relative those solutions where a corresponding cone with its opening is rotated to different positions relative the flow through opening, depending on the preset of the Kvs-value, and the opening in these solutions doesn't always coincide with the flow through opening in the valve body.

Depending on manufacturing tolerances at inherent moving parts there will always come to leakage flows around regulating cones/parts in regulating valves. To minimize those leakage flows it is necessary to control the characteristic of the regulating valve irrespective of the flow through the valve. Especially at small flows a leakage has a considerable influence on the characteristic, according to a preferred embodiment of the invention the sealing of the leakage flow is made around the first cone by that a seal is provided between the first cone and de second cone. The seal is mounted in a groove in the inner surface of the second cone and surrounds so the first outer surface of the first cone and seals the gap that must exists for the mobility of the parts relative each other. This design leads to that the seal is found in a position where the sensitivity to manufacturing tolerances is not so important, and accordingly the need of small tolerances by the manufacturing are reduced and the accuracy in the regulation characteristic will be better.

According to a further preferred embodiment of the invention the complete regulating valve is provided with a shut-off function by that the second cone in its second end position, in connection to the valve seat, totally shields the flow through opening. In the first farther end position of the second cone, relative the valve body, the flow through opening isn't shielded at all. Accordingly a shut off function is also achieved with one and the same valve.

According to a further preferred embodiment of the invention the valve seat comprises a seal, which is provided to seal between the first cone and the valve seat, here also to prevent flow of leakage, which influences the characteristic in a negative way. The seal also has the function to seal against leakage when the valve is fully closed to flow through of fluid, in its shut off position, by that the second cone in its second end position, in connection to the valve seat, is touching the bottom by the seal which leads to that nu fluid can pass the cones. Thus, with one and the same part—the seal of the seat—both a sealing of the leakage at normal operation and together with the second cone a tight shut off position by the complete valve is achieved.

To minimize undesired pressure drop over the complete valve it is advantageously to let fluid flow essentially in parallel with the main flow direction through the complete regulating valve, without considerable deflections of the flowing path. According to a preferred embodiment of the invention the flow through opening for the fluid of the complete regulating valve is hence preferable located in the lower part of the valve body in direct connection to the valve seat and close to the center lines of the inlet connection and the outlet connection and hence close to the main direction for the run through of the complete valve. This minimizing of the flow deflection at the place of throttling leads to minimal turbulence in the flow, resulting in that also the problems with sounds from the location of throttling is reduced which is a known problem in several older solutions.

By the same reason as above, minimizing the pressure drop, turbulence and sound, coincides, according to a preferred embodiment of the invention, the symmetric line by the opening of the first cone mainly with the symmetric line of the flow through opening. According to the above mentioned preferred embodiment the second cone is rotary locked in this position and the first cone is rotary locked to the second cone. The first cone is how-ever axial movable, i.e. in the same direction as the symmetric line of the opening extends, whereby the first opening of the cone also is moved along the symmetric line of the flow through opening and therefore the main flow through of the two openings coincides resulting in a minimal turbulence.

Advantageous Effects

Accordingly, both earlier known advantages together with new advantages in one and the same valve are achieved:
  A valve where the Kvs-value can vary in one and the same valve body.
  The characteristic of the valve is the same irrespective of which Kvs-value is set.
  A good accuracy by the regulation with fully hub by regulation irrespective of the pre-setting, and of the Kvs-value set by the valve.
  A valve that by the manufacturing is less sensitive to tolerances and deviations in size.
  A valve where the preset of the Kvs-value can be done irrespective of if an actuator is mounted or not.
  Thus the valve can be supplied completely with mounted actuator if desired to facilitate and speed up the installation work on place.

The constructive design of the present invention is described in detail below. In addition the prior art is further developed in the field in different aspects. This is realized in the present invention by that a device of the above described kind mainly is constituted in a way that is evident from the characterizing part of claim 1. Further characteristics and advantages of the invention is evident from following description related to the attached drawings, showing a preferred, but not limiting example of embodiment of the invention.

BRIEF DESCRIPTION OF THE DRAWINGS

In detail represents in diametrical, partly schematic cross sections or perspective views.

DETAILED DESCRIPTION OF THE DRAWINGS

Figure 1:
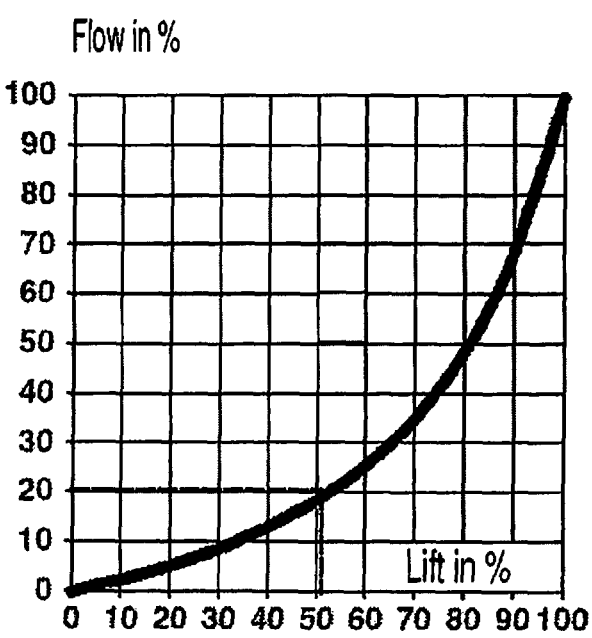
FIG. 1 shows a curve with regulation characteristics according to EQM (Equal percentage Modified)

FIG. 1 shows an example of a curve over the fluid flow through the valve as a function of the height of lift by the valve cone for the present invention, at a constant difference pressure over the valve. Exemplified by an assumption that the exothermic device to which the valve regulates the flow, gives 50% of prescribed power when the flow is 20% of the prescribed, will in this case the valve give 20% flow when it is open to 50%. This means that when the valve is open to 50% the power is also 50%. When this relation coincides for all flows the valve has a logarithmic function, or a modified logarithmic characteristic—an EQM-function. The present invention has by this design of the cone, the features that this relationship between height of lift, flow and power is maintained for different Kvs-values, by one and the same valve dimension.

Figure 2A:
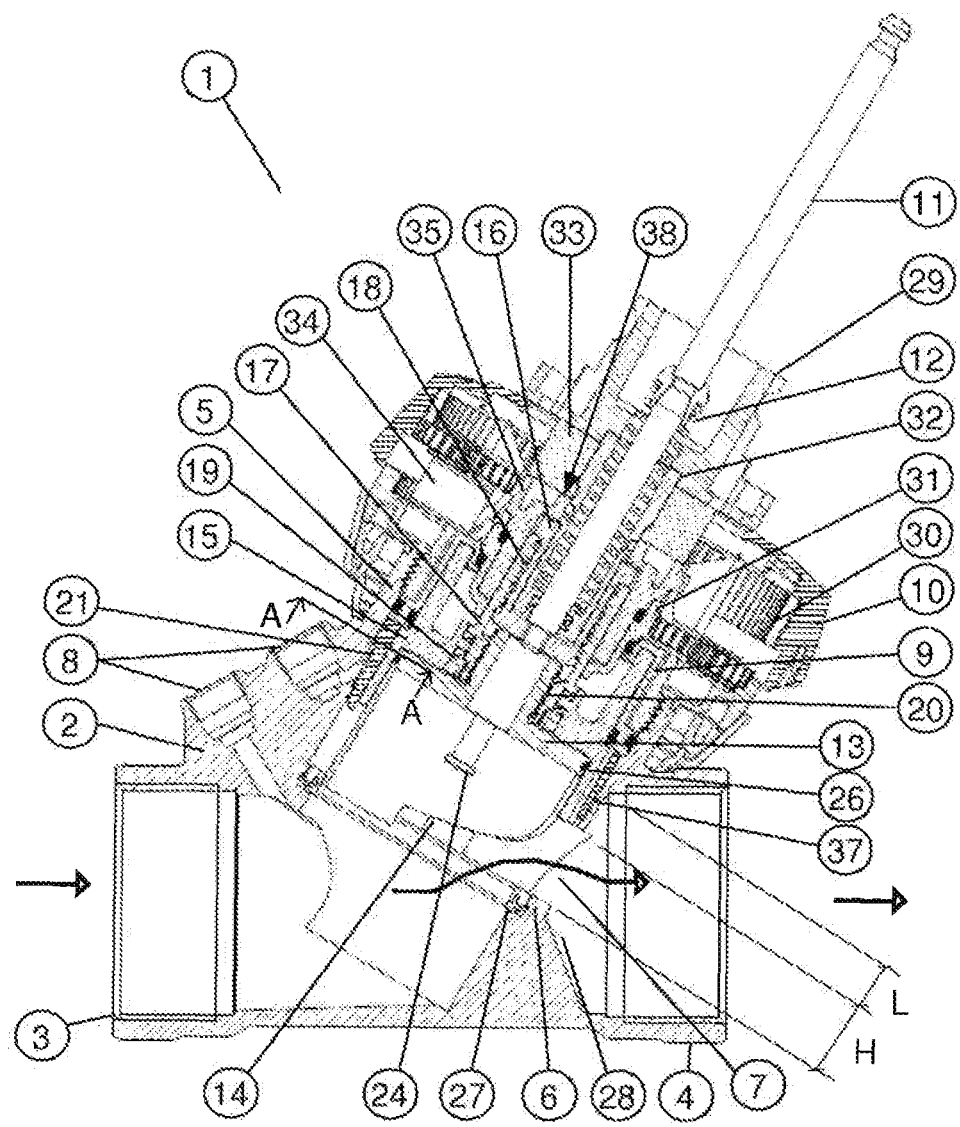
FIG. 2a shows a longitudinal cut through a complete regulating valve according to a preferred embodiment of the device.

FIG. 2a shows a longitudinal cut through a complete regulating valve 1 according to a preferred embodiment of the device, comprising a valve body 2 with a inlet connection 3 and an outlet connection 4, for connection to the tube system in which the complete regulating valve 1 works. At the valve body 2 also two connections for measuring nipples 8 are provided for measuring and eventually detecting the static difference pressure over the regulating valve. The fluid that flows through the regulating valve during operation flows from the inlet side, the inlet connection 3, to the outlet side, the outlet connection 4, via a flow through opening 7 with a height H, in connection with a valve seat 6, which seat is provided in the lower part 28 of the valve body. A valve neck 5 emanates in an angle from the valve body 2, a valve trim complete 38 is provided in the valve neck 5. The valve trim complete 38 comprises a top piece 9 and a sleeve shaped, cylindrical first cone 13, which is axial displaceable arranged in the valve neck 5. The lower part of the first cone 13, closest to the valve seat 6 is open for inflow of the medium, and the outflow of the medium from the first cone 13 occurs through the opening 14 of the first cone, which is provided at the periphery of the first cone 13 and in the main direction for the flow through of the medium through the complete regulating valve 1. The outer surface of the first cone, preferable at its upper part, is partly surrounded by a sleeve shaped, cylindrical second cone 15, which is arranged displaceable in the valve body 6. The first cone and the second cone 15 is additionally displaceable relative each other and between the outer surface of the first cone and the inner surface of the second cone a seal 26, preferable in form of an 0-ring, is provided.

By that the first and the second cone are displaceable relative each other, it is allowed that presetting of the complete regulating valve 1, i.e. the preset of the Kvs-value, the maximal flow that has to flow through the regulating valve, can be done without limiting of the hub. This is a very important feature since the accuracy by the regulation then will be good, irrespectively of selected presetting. By presetting, in the presetting position of the regulating valve, the second cone 15 will be found in its upper, relative the valve seat farther position. The presetting means that the position/distance of the opening 14 of the first cone relative the valve seat 6 is set. By the presetting a valve hand wheel 10, provided around the valve neck 5, is rotated, which valve hand wheel via teeth is engaged with a rotatable, with teeth provided counter gear 30. This counter gear in turn is engaged with a rotatable and with teeth provided so called sol 31 which in turn is engaged with the preset screw 17 and accordingly the rotary motion of the valve hand wheel 10 is transmitted to the preset screw 17. This is rotatable but is not moved axially in the valve neck during the presetting.

The lower part of the preset screw 17 comprises an inner thread which cooperates with an outer thread provided at the upper part of the first cone 13 and by the rotation of the preset screw 17 the rotation is transmitted, via the intermediate thread joint 20, to an axial movement at the first cone 13. Accordingly the first cone is moved axially in direction to or from the valve seat 6. It is to be noted that the second cone 15 is not influenced, but will stay in its upper position by the presetting. Later, when the presetting is finished and the valve is ready to regulate, the mutual position, given by the presetting, between the first and the second cone will not be changed.

By the regulation of the system in which the complete valve 1 is a part, usually a mounted (not shown) actuator is used to control the regulating valve, which actuator is mounted at the adapter 29 of the regulating valve. The adapter is replaceable, depending on what kind of actuator is used. The actuator communicates with a detector in the system, and by changed need of flow the actuator acts on a valve shaft 11, which is axially displaceable in the valve neck 5. The axial movement of the valve shaft 11 is transmitted to the second cone 15 by that the shaft is fixed in a screw, denoted shutting off screw 16, which screw is displaceable provided in the valve neck 5. This shutting off screw 16 in turn is, in the regulation position, axially fixed arranged to the upper end of a presetting screw 17, via a thread joint 18, and also the presetting screw 17 is displaceable provided in the valve neck 5. Further the second cone 15 is fixed arranged to the presetting screw 17 via a nut 19. The lower part of the presetting screw 17 comprises, which is described above, an inner thread which cooperates with an outer thread provided at the upper part of the first cone and these thread joint 20 axially locks in the regulation position, the presetting screw 17 and the first cone to each other. When the valve shaft 11 is axially moved also the shutting off screw 16, the presetting screw 17 and the first cone 13 and the second cone 15 is moved axially in the valve neck 5 without changing of the mutual positions of the cones relative each other. By the simultaneous axial movement of the first cone 13 and the second cone 15 the open area for the flow through of the medium through the opening 14 of the first cone is changed because the opening 14 is shielded in different degree by the valve seat 6 depending on the movement of the fist cone 13, whereby the flow through the complete regulating valve 1 is changed. To secure that the opening 14 of the first cone always is optimally located relative the flow, the first cone 13 is rotary locked relative the second cone 15 by that two guide pins 24 are fixed arranged in the second cone 15 and those guide pins extends axially relative the first cone and the second cone 15 and through two recesses 25 in the top of the first cone. Those guide pins 24 has a length that is at least equal to the length L of the presetting, i.e. long enough to allow the presetting, when the first cone 13 and the second cone 14 are displaceable relative each other. Around the periphery of the second cone 15 a signal ring 21 is provided, and this signal ring comprises a ridge 22, which preferable has a longitudinal extension in axial direction along the inner and outer surface of the signal ring 21. The longitudinal ridge 22 is provided to grip in a groove 36 at the periphery of the second cone whereby the signal ring 21 is being arranged rotary locked around and relative the second cone 15. In addition the ridge 22 of the signal ring is outwards, relative the second cone 15, arranged to run in a groove 23 in the valve neck 5, which is evident from the detail view 2b, and where the groove 23 runs in axial direction relative the second cone 15 and the groove 23 is at least as long as the hub of the valve. Thus the second cone is rotary locked relative the valve neck 5. The signal ring comprises also a groove 37, which runs around the whole of its periphery and which groove is arranged to create a communication between the low pressure side at the valve, after the valve seat 6, and one of the connections for the measuring nipples 8. The other connection for the measuring nipple 8 communicates with the high pressure side of the valve, the inlet side.

Around the valve shaft 11 there is a clamped return spring 12 with surrounding spring sleeve 32. The return spring 12 sees to that the shaft returns to its upper, farther position (a), relative the valve seat 6, so called spring return if the actuator of any reason will be out of voltage. For fixing the parts in the valve trim 38 and for control a top piece 9 is provided. The top piece 9 will be fixed arranged against the valve neck 5 via one in the valve neck fixed mounted lock 33 for the top piece, which lock is firmly screwed in the material of the valve neck 5 by the assembling of the valve. The complete regulating valve 1 also comprises a position for shutting off the flow through, a shutting off function. By the shut off the valve hand wheel 10 is rotated, whereby the valve hand wheel via teeth, is engaged with a rotatable counter gear 34, provided with teeth, arranged to the function of shutting off. This counter gear in turn is engaged with a rotatable so called sol 35, provided with teeth, which sol in turn is engaged with the shut off screw 16. Thus by the rotation of the valve hand wheel 10 the movement is transmitted to the shut off screw 16 which by the thread joint 18, transmit the rotator motion to an axial movement at the presetting screw 17. By that this, which is described above, is fixed arranged with the second cone 15, the second cone will also be moved axially and accordingly also the first cone. To entirely shut off the valve for flow through, the second cone 15 is moved axially in direction to the valve seat 6 until the whole flow through opening 7 is entirely shielded. In the valve seat 6 a seat seal is provided to seal against it, against the edge directed to the valve seat on the second cone 15 by completely shut off. The same seat seal 27 also seals between the first cone 13 and the valve seat 6, irrespective of the position of the function. The function is also evident from FIG. 4d, where the second cone is on its way to a closed position, in direction down to the valve seat.

Figure 2B:
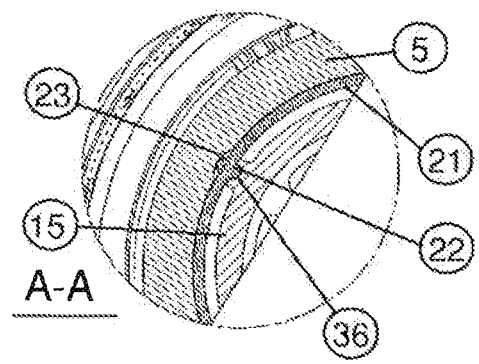
FIG. 2b shows an enlargement of a cut through the second cone with its signal ring and ridge.

FIG. 2b shows an enlargement of a cut A-A through the second cone with its signal ring and ridge. The signal ring 21 comprises the longitudinal ridge 22, which is arranged to run in a groove 23, which runs axially in the valve neck 5. The signal ring is mounted rotary locked on the second cone 15 through the ridge 22 which cooperate with a groove 36 at the periphery of the second cone.

Figure 3:
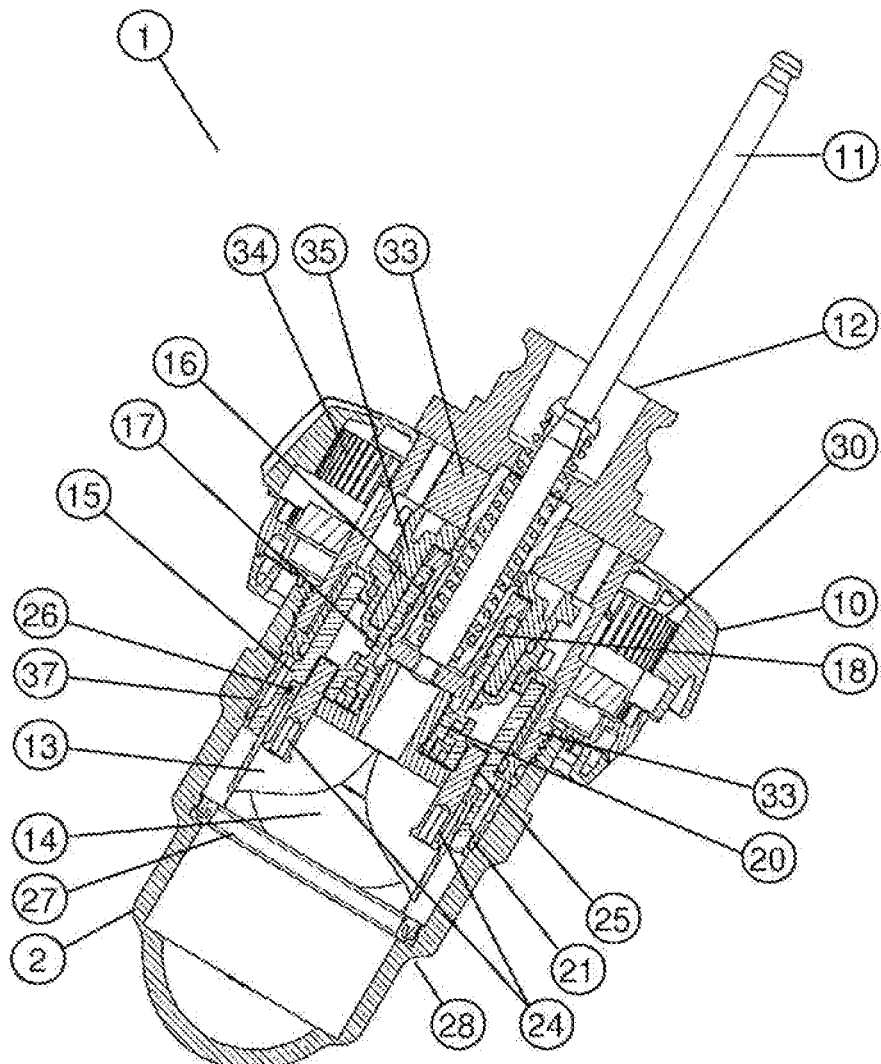
FIG. 3 shows a transverse cut through a complete valve according to a preferred embodiment of the device.

FIG. 3 shows a transverse cut through a complete regulating valve according to a preferred embodiment of the device. In the figure is clear that the opening 14 of the first cone has a height that is higher than the height of the flow through opening 7, and more exactly a height that is at least equal to the height at the height H of the flow through opening 7, plus the length of the presetting movement, the presetting movement L, i.e. L+H. By the moment of presetting, as said before, the second cone 15 is in its upper, farther position relative the valve body 6 and in the figure also the first cone 13 is in its upper position, which corresponds to the maximal Kv-value of the regulating valve, its maximal Kvs-value, with maximal possible flow through. If a lower maximal flow is desired, a lower Kvs-value, the first cone 13 is moved in above described way in direction to the valve seat 6, with its seat seal 27, whereby the exposed opening is reduced and accordingly also the possible maximal flow through the valve is reduced.

By that the opening 14 of the first cone has the height L+H, accessible hub is by the regulation still maximal irrespective of selected Kvs-value. The exposed part of the opening 14 of the first cone is still equal to the height H at the flow through opening 7 and no limitation of the hub is done even if the presetting is selected to the less Kvs-value of the valve.

The complete regulating valve 1 also comprises, as the most regulating valves a decimal scale and indicating ring as well as a cover cap (not shown). In addition the first and the second cone is balanced by pressure by recesses 25 in the second cone 15 to the cavity above the same and by this the static pressure is at the same order of magnitude on both sides of the moving cones.

Figure 4A:
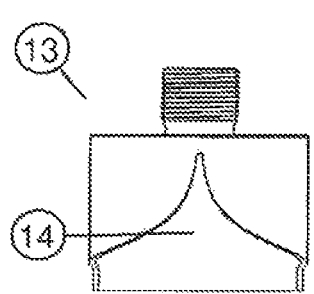
FIG. 4a shows the design of the first cone in detail, according to a preferred embodiment.

FIG. 4a shows the design of the first cone 13 in detail. The first cone 13 is sleeve shaped and cylindrical, with an open lower part for inflow of fluid and further the outflow of fluid occurs via the opening 14 of the first cone. The shape of the opening 14 of the first cone is calculated and gives the complete valve an EQM-characteristic. In addition the threaded part of the upper part is seen, which cooperate with the lower, inner threaded part of the pre set screw 17, which is already described.

Figure 4B:
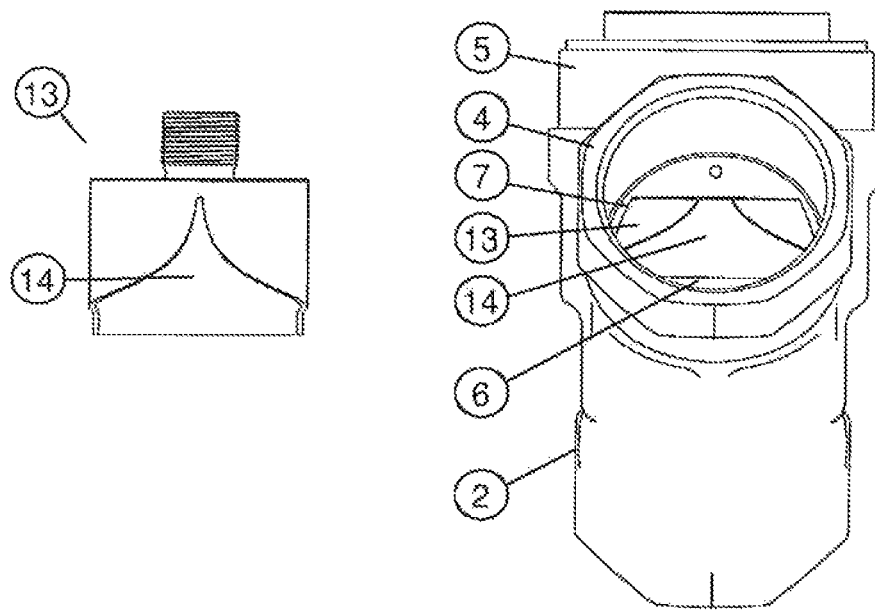
FIG. 4b shows the regulating valve in a view from the outlet side, with the first cone set to maximum preset value, at maximal Kv-value.

FIG. 4b shows the regulating valve in a view from the outlet side, with the first cone 23 set to maximum preset value, at max Kv-value. In the bottom of the valve body 5 the flow through opening 7 is provided and this opening is defined by its sides, upper edge as well as the valve seat 6. Behind the flow through opening 7 the first cone 13 is seen with its opening 14 in a position that corresponds to maximal opening, i.e. presetting with maximal Kvs-value, which means largest possible flow. The second cone 15 is located in its upper position, not seen in the figure.

Figures 4C, 4D:
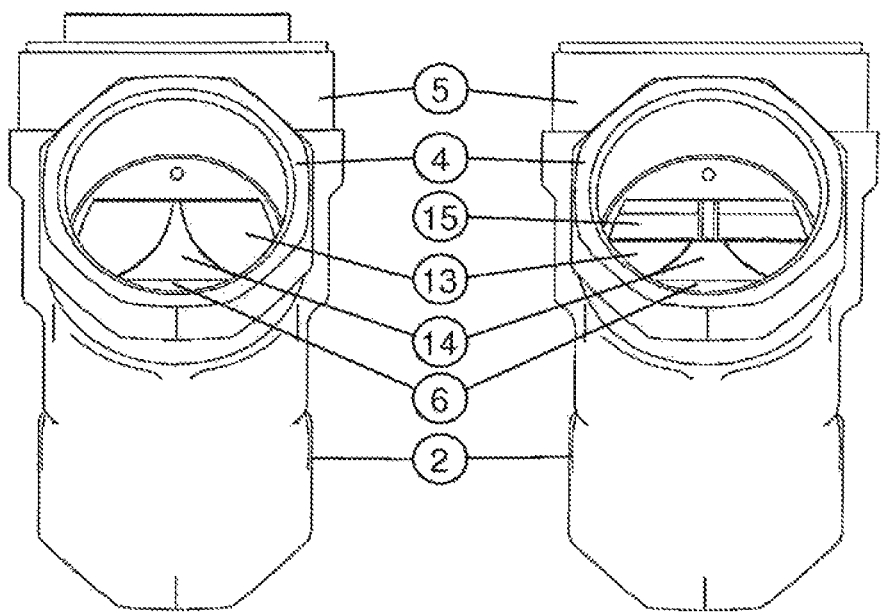
FIG. 4c shows the regulating valve in a view from the outlet side, with the first cone set to ca 50% of maximal preset value.
FIG. 4d shows the regulating valve in a view from the outlet side, with the second cone which partly shields the flow through opening.

FIG. 4c shows the regulating valve in a view from the outlet side 4, with the first cone set to a position that gives e new Kvs-value, for example ca 50% of maximal preset value. Compared to FIG. 4b the first cone 13 in FIG. 4c is moved in direction to the valve seat 6 whereby the upper part of the opening 14 of the first cone is exposed and by that a lower Kv-value is set. Still a fully hub is obtained for regulation since the second cone 15 neither in this position shields the flow through opening 7

FIG. 4d shows the regulating valve in a view from the outlet side 4, with the second cone 15, which partly shields the flow through opening 7. The valve has in this figure the same presetting as in FIG. 4c, i.e. ca 50% of maximal preset value. The second cone 15 blocks in the figure partly the flow through opening 7, which has started to be totally shielded by the second cone. By continued rotation of the valve hand wheel (not shown) the second cone will at the end totally shield the flow through opening 7 and the valve is totally closed for flow through. In this position the seat seal 27 seals between the lower edge of the second cone 15 and the valve seat 6.

PARTS LIST 1 complete regulating valve
2 valve body
3 inlet connection
4 outlet connection
5 valve neck
6 valve seat
7 flow through opening
8 connection for measuring nipple
9 top piece
10 valve hand wheel
11 valve shaft 12 return spring
13 first cone
14 opening of the first cone
15 second cone
16 shut off screw
17 preset screw
18 thread joint
19 nut
20 thread joint
21 signal ring
22 ridge
23 groove
24 guide pin
25 recess
26 seal
27 seat seal
28 lower part of the valve body
29 adapter
30 counter gear
31 sol, presetting
32 spring sleeve
33 lock of the top piece
34 counter gear, shut off
35 sol, shut off
36 groove
37 groove, signal ring
38 valve trim complete

The invention claimed is:

1. A regulating valve for flow control of a medium in a heating or cooling system comprising:
   a valve body including
      an inlet connection,
      an outlet connection,
      at least one connection for a measuring nipple for measuring of pressure or temperature levels, and
      a valve neck including a valve seat, a flow through opening with a height, a complete valve trim, a valve hand wheel, and a shaft with a return spring provided through the valve hand wheel and the complete valve trim, the complete valve trim including a first cone to determine a preset Kvs-value of the regulating valve, the first cone including at least one opening for flowing through of the medium, wherein a design of the at least one opening is useable to determine a regulating characteristic of the regulating valve, the Kvs-value of the valve being continuously changeable, with maintained regulating characteristic, the first cone being continuously, axially displaceable arranged relative the valve seat, wherein selected parts of the opening of the first cone are shielded by the valve seat, and wherein a length of the relative displacement is a length of the regulating valve.

2. The regulating valve of claim 1, wherein the first cone in a regulating position is arranged to regulate the flow through the complete regulating valve, wherein the shaft is fixedly arranged with a shut-off-screw, the shut-off-screw being united with a preset screw the second cone being axially locked to the preset screw, the first cone being axially locked to the preset screw, and wherein the shut-off-screw is axially displaceable under influence by the shaft whereby accordingly both the first and the second cone are axially moveable at the same time, and wherein the flow through the complete regulating valve is determinable by the opening of the first cone and its shielding to the valve seat and corresponds to the load/power-extraction that exists in every individual working case.

3. The regulating valve of claim 1, wherein the first cone in the presetting position is axially displaceable relative the second cone.

4. The regulating valve of claim 2, wherein the first cone in the presetting position is axially displaceable by a rotary motion of the valve hand wheel, and wherein the valve hand wheel then is engaged with the preset screw, whereby the rotary motion is transferred to an axial motion in the first cone via the thread joint, which is arranged between the pre-set screw and the first cone.

5. The regulating valve of claim 1, wherein the length of the movement of the second cone between its end positions is at least equal to the height at the flowing through opening and wherein the length constitutes a hub of the regulating valve.

6. The regulating valve of claim 1, wherein the first cone in the regulating position is arranged to regulate with fully hub, irrespective of the selected Kvs-value, and wherein the opening of the first cone has a height that is at least the same as the height of the flow through opening plus the preset length.

7. The regulating valve of claim 6, wherein the height of the flowing through opening, irrespective of selected preset position, is not shielded by neither the second cone or by the height of the opening of the first cone.

8. The regulating valve of claim 1, wherein the second cone is rotary locked relative the valve neck, wherein a signal ring is rotary locked arranged around the second cone via one at the signal ring arranged ridge, whose inner side extends in direction inwards to the center of the signal ring and the inner side of the ridge engages in a groove at the outer surface of the second cone, and the ridge also extends outwards from the outside of the signal ring to a groove provided in the valve neck, in which groove the ridge is arranged to travel.

9. The regulating valve of claim 8, wherein the first cone is rotary locked to the second cone, wherein at least one guide pin is fixed in the second cone and wherein the guide pin runs axially relative the extension of the second cone and further through a recess in the first cone and so the first cone is rotary locked relative the second cone and is also rotary locked relative the valve neck, and moreover the first cone is axially displaceable relative the guide pin.

10. The regulating valve of claim 1, wherein a sealing is provided between the outer surface of the first cone and the inner surface of the second cone.

11. The regulating valve of claim 1, wherein the second cone in its first farther end position, relative the valve seat, lays the flow through opening totally free, and wherein the second cone in its second end position, in connection against the valve seat, entirely shields the flow through opening and thus gives the complete regulating valve its closed position and accordingly a closing function.

12. The regulating valve of claim 1, wherein, in the valve seat, a seat sealing is provided, which seals between the first cone and the valve seat, and also seals between the bottom of the second cone and the valve seat when the second cone is in its second end position, in connection against the valve seat.

13. The regulating valve of claim 1, wherein the flow through opening is arranged in the lower part of the valve body in direct connection to the valve seat and close to the center lines of the inlet connection and the outlet connection and accordingly close to the main direction for the flow through of the complete valve.

14. The regulating valve of claim 1, wherein the opening of the first cone by position coincides with the flow through opening.

15. The regulating valve of claim 2, wherein the first cone in the presetting position is axially displaceable relative the second cone.

16. The regulating valve of claim 3, wherein the first cone in the presetting position is axially displaceable by a rotary motion of the valve hand wheel, and wherein the valve hand wheel then is engaged with the preset screw, whereby the rotary motion is transferred to an axial motion in the first cone via the thread joint, which is arranged between the preset screw and the first cone.

* * * * *

UNITED STATES PATENT AND TRADEMARK OFFICE
CERTIFICATE OF CORRECTION

PATENT NO. : 8,833,392 B2  
APPLICATION NO. : 13/989202  
DATED : September 16, 2014  
INVENTOR(S) : Per Norlander et al.

Page 1 of 1

It is certified that error appears in the above-identified patent and that said Letters Patent is hereby corrected as shown below:

In the Claims

Col. 11, lines 30-53, should read,

1. A regulating valve for flow control of a medium in a heating or cooling system comprising:
a valve body including
    an inlet connection,
    an outlet connection,
  at least one connection for a measuring nipple for measuring of pressure or temperature levels, and
  a valve neck including a valve seat, a flow through opening with a height, a complete valve trim, a valve hand wheel, and a shaft with a return spring provided through the valve hand wheel and the complete valve trim, the complete valve trim including a first cone to determine a preset Kvs-value of the regulating valve, the first cone including at least one opening for flowing through of the medium, wherein a design of the at least one opening is useable to determine a regulating characteristic of the regulating valve, the Kvs-value of the valve being continuously changeable, with maintained regulating characteristic, the first cone being continuously, axially displaceable arranged relative the valve seat, wherein selected parts of the opening of the first cone are shielded by the valve seat, and wherein a length of the relative displacement is a length of the regulating valve, and wherein the complete valve trim comprises a second cone, the second cone at least partly surrounding an
outer surface of the first cone and wherein the second cone is continuously, axially displaceable in the valve body and the valve neck, between a first farther end position relative the valve seat and a second end position in connection against the valve seat.

Signed and Sealed this  
Twenty-eighth Day of April, 2015

Michelle K. Lee  
*Director of the United States Patent and Trademark Office*